UNITED STATES PATENT OFFICE.

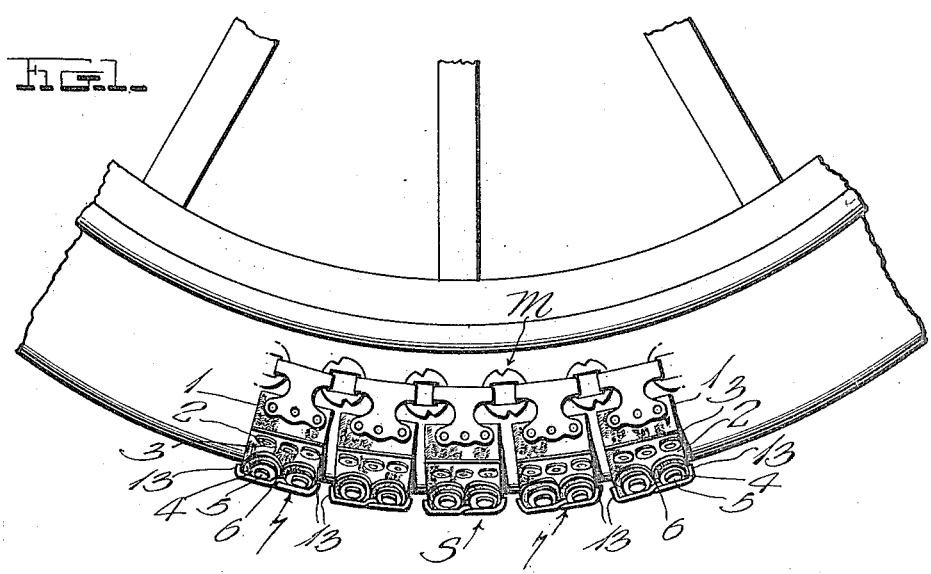

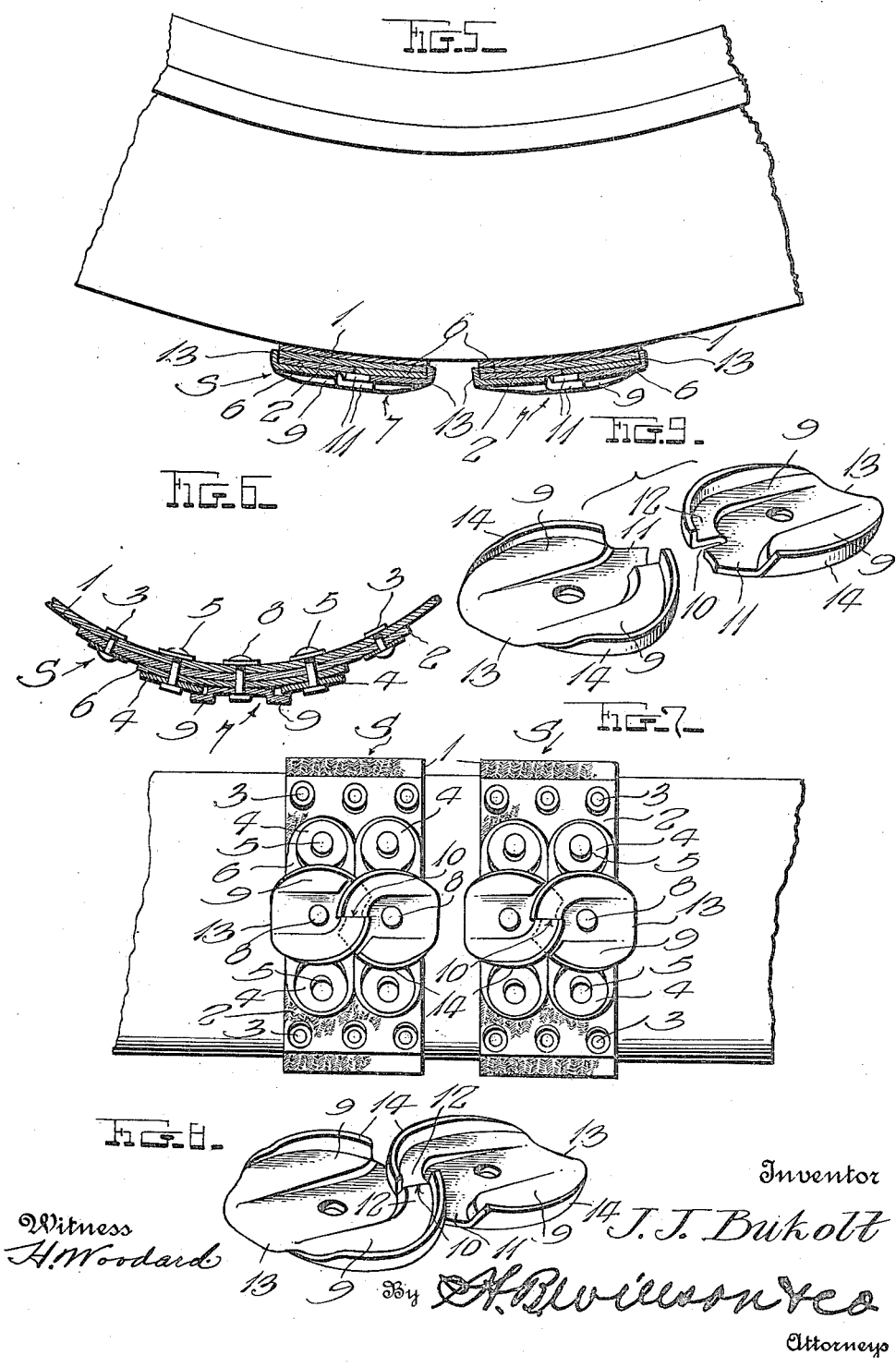

JOHN JOSEPH BUKOLT, OF STEVENS POINT, WISCONSIN.

TIRE-ARMOR.

1,277,374.   Specification of Letters Patent.   Patented Sept. 3, 1918.

Application filed March 13, 1918. Serial No. 222,168.

*To all whom it may concern:*

Be it known that I, John J. Bukolt, a citizen of the United States, residing at Stevens Point, in the county of Portage and State of Wisconsin, have invented certain new and useful Improvements in Tire-Armors; and I do declare the following to be a full, clear, and exact description of the invention, such as will enable others skilled in the art to which it appertains to make and use the same.

My invention relates to improvements in tire armors of the type employing transverse straps extending across the tire and provided with metal tread members to prevent wear and other injury to the tire.

The principal object of the invention is to provide tread members for the straps which will provide for effective engagement with the road and protection of the casing, yet will be sufficiently flexible to obtain the best results.

Other objects are to construct the tread members in such manner as to cause them to coöperate effectively with other features to provide a simple and comparatively inexpensive, yet a highly efficient and durable armor.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a side elevation of a portion of a pneumatic tire equipped with the improved armor;

Fig. 2 is a plan view of two sections of the armor upon the tire;

Fig. 3 is a perspective view of two of the tread members engaged one with the other;

Fig. 4 is a perspective view of the tread members shown in Fig. 3 but illustrating them separated;

Fig. 5 is a sectional view on the plane of the line 5—5 of Fig. 2;

Fig. 6 is a sectional view on the plane indicated by the line 6—6 of Fig. 2;

Fig. 7 is a plan view showing a slightly different form of construction;

Fig. 8 is a perspective of two of the interengaged tread members shown in Fig. 7; and Fig. 9 is a perspective view of said tread members separated from each other.

The armor as a whole consists of a plurality of sections S connected by suitable means M whose construction forms no part of the present invention and will therefore not be specifically entered into, and since all of the sections in question are identical, but one will be described. To this end, the numeral 1 designates a strap of canvas or other suitable fabric adapted to extend transversely of the tire, the intermediate portion of said strap being reinforced and somewhat stiffened by a sheet 2 of fabric or other suitable material which may well be impregnated with rubber, the ends of the sheet 2 being secured to the strap 1 by rivets 3. On opposite sides of the tread portion of the sheet 2, are located rows of wear disks 4 which are secured in place by rivets 5, suitable reinforcing and cushioning material 6 being located between said disks and sheet and extending over the tread portion of the latter as shown, whereby to guard the fabric against injury from the disks 4 and the tread members 7.

Each section S of the armor is provided with two of the tread members 7, said tread members being each formed of a metal plate riveted at 8 to the parts 1, 2 and 6 and located between the rows of disks 4, the edges of said plates being offset outwardly as seen at 9 to overlie the inner portions of said disks as shown clearly in the drawings. The inner ends of the tread members or plates 7 are each formed with a central longitudinal slit 10 and the metal on opposite sides of these slits is offset into spaced planes to provide each plate with an inner tongue 11 flush with the body portion of the plate and with an outer tongue 12 flush with one of the offset edges 9, the parts being so arranged that the outer tongues 12 of the two plates overlie the inner tongues 11, with the inner edges of said outer tongues in abutting relation. As will be clear from the dotted lines of Figs. 2 and 7, the ends of the tongues 11 are preferably shaped for contact with the metal at the lines upon which the offset edges 9 join the body portions of the plates 7. The outer ends of the plates in question are preferably turned inwardly around the edges of the straps as shown at 13, in order to protect said edges against wear. Also, the plates in question may either be of the plain tread type shown in Figs. 1 to 6, or may be provided with anti-skidding flanges or calks 14 as illustrated in Figs. 7, 8 and 9. These flanges are preferably formed by a stamping operation and in fact each tread member will in most cases be constructed of stamped metal although other construction might well be employed.

From the foregoing, taken in connection with the accompanying drawings, it will be obvious that although my invention is of comparatively simple and inexpensive nature, it will be highly efficient and durable. The central portions of the sections S are stiffened and reinforced by the several plies of material and the leather or like material 6 is highly advantageous for absorbing shocks and preventing the metallic parts of the armor from injuring the fabric. The tread members 7 receive the greater part of the wear but are constructed to withstand the same to the maximum and by associating said members in the manner shown and described, the necessary flexibility to insure best results is permitted, yet no gaps exist between the plates of any sections S through which the casing of the tire might be punctured. Since probably the best results are obtained from the several details shown and described, these details are by preference employed, but within the scope of the invention as claimed, numerous minor changes may well be made.

I claim:

1. A tire armor comprising a flexible member having means for securing it in place, metallic armor on said member comprising a pair of plates disposed end to end, the adjacent ends of said plates each having a longitudinal slit and the metal on opposite sides of said slits being offset into spaced planes to form an inner and an outer tongue for each plate, the outer tongue of each plate overlying the inner tongue of the outer plate, and fasteners passing through said plates for securing them to said member.

2. A structure as specified in claim 1, the inner edge of each outer tongue abutting the inner edge of the adjacent outer tongue.

3. A tread member for tire armors comprising a metal plate having in one end a longitudinal slit, the metal on opposite sides of said slit being offset into spaced planes to form a pair of tongues adapted to overlap similar tongues of another tread member.

4. A tire armor comprising a tough flexible strap to extend transversely across the tire, a row of wear disks on each side of the tread portion of said strap and riveted in place, tough reinforcing and cushioning material interposed between said disks and said sheet and extending over the tread portion of the latter, and a tread member riveted on said reinforcing and cushioning material between said rows of disks with its edges overlapping said disks.

5. In a tire armor, a flexible member to cover the tire, and tread means secured on said member and including a pair of plates disposed end to end, the inner end of each plate having an inner and an outer tongue, the outer tongue of each plate overlapping the inner tongue of the other plate.

In testimony whereof I have hereunto set my hand in the presence of two subscribing witnesses.

JOHN JOSEPH BUKOLT.

Witnesses:
E. J. BOYER,
E. T. BUKOLT.

Copies of this patent may be obtained for five cents each, by addressing the "Commissioner of Patents, Washington, D. C."